United States Patent
Lee et al.

(10) Patent No.: US 10,788,573 B2
(45) Date of Patent: Sep. 29, 2020

(54) LIGHT DETECTION AND RANGING DEVICE

(71) Applicant: LG INNOTEK CO., LTD., Seoul (KR)

(72) Inventors: Chang Hyuck Lee, Seoul (KR); Young Seop Moon, Seoul (KR); Lee Im Kang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 422 days.

(21) Appl. No.: 15/749,968

(22) PCT Filed: Aug. 3, 2016

(86) PCT No.: PCT/KR2016/008542
§ 371 (c)(1),
(2) Date: Feb. 2, 2018

(87) PCT Pub. No.: WO2017/023107
PCT Pub. Date: Feb. 9, 2017

(65) Prior Publication Data
US 2018/0231643 A1 Aug. 16, 2018

(30) Foreign Application Priority Data
Aug. 3, 2015 (KR) .......................... 10-2015-0109456

(51) Int. Cl.
*G01C 3/08* (2006.01)
*G01S 7/481* (2006.01)
(Continued)

(52) U.S. Cl.
CPC .......... *G01S 7/4817* (2013.01); *G01S 7/4814* (2013.01); *G01S 7/4815* (2013.01); *G01S 17/42* (2013.01);
(Continued)

(58) Field of Classification Search
CPC .... G02B 27/10; G02B 27/09; G02B 27/0087; G01S 7/4814; G01S 7/4815; G01S 7/4817; G01S 17/42; G01S 17/89
(Continued)

(56) References Cited

U.S. PATENT DOCUMENTS 5,373,137 A * 12/1994 McLaughlin ........ B23K 26/067
219/121.68
7,742,213 B2 6/2010 Potsaid et al.
(Continued)

FOREIGN PATENT DOCUMENTS

KR 10-2013-0129351 A 11/2013
WO WO 2014/144877 A1 9/2014

*Primary Examiner* — Mark Hellner
(74) *Attorney, Agent, or Firm* — Birch, Stewart, Kolasch & Birch, LLP

(57) ABSTRACT

An optical device provided by the present invention can comprise: a light separating unit receiving one first beam so as to output k (k is a natural number) second beams; a light steering unit changing the k second beams up to a first steering angle, so as to output a third beam; a lens unit receiving the third beam so as to adjust the first steering angle, thereby outputting a fourth beam; and a driving unit for controlling a first light output angle, wherein a wave front of the second beams can be wider than that produced by diving a wave front of the first beam by k.

20 Claims, 12 Drawing Sheets

(51) Int. Cl.
  *G02B 27/09*  (2006.01)
  *G02B 27/10*  (2006.01)
  *G01S 17/89*  (2020.01)
  *G01S 17/42*  (2006.01)
  *G02B 27/00*  (2006.01)

(52) U.S. Cl.
  CPC .......... *G01S 17/89* (2013.01); *G02B 27/0087* (2013.01); *G02B 27/09* (2013.01); *G02B 27/10* (2013.01)

(58) Field of Classification Search
  USPC ........................................................ 356/3.05
  See application file for complete search history.

(56) References Cited

U.S. PATENT DOCUMENTS

| | | | |
|---|---|---|---|
| 2002/0186919 A1* | 12/2002 | Pepper | G02F 1/292 |
| | | | 385/27 |
| 2009/0213466 A1 | 8/2009 | Murnan et al. | |
| 2012/0019826 A1 | 1/2012 | Graham et al. | |
| 2013/0242400 A1* | 9/2013 | Chen | G02B 27/0087 |
| | | | 359/618 |
| 2013/0248731 A1 | 9/2013 | Tanimoto et al. | |
| 2014/0118718 A1 | 5/2014 | Jungwirth | |
| 2014/0192394 A1 | 7/2014 | Sun et al. | |
| 2017/0356983 A1* | 12/2017 | Jeong | G01S 7/4817 |

* cited by examiner

【FIG. 1】
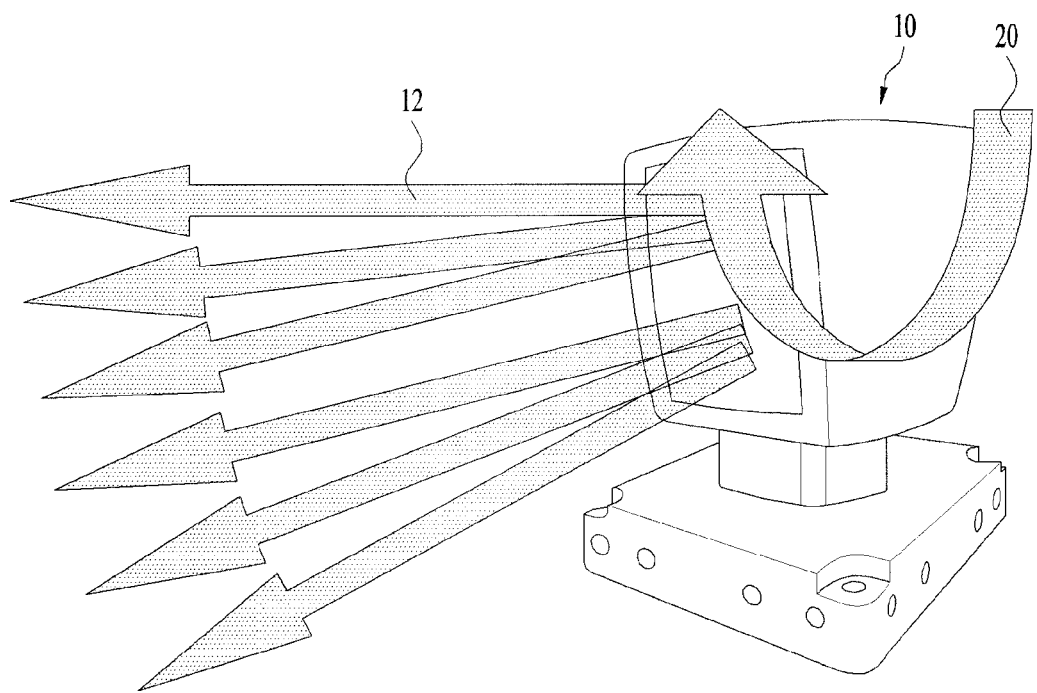

[FIG. 2]
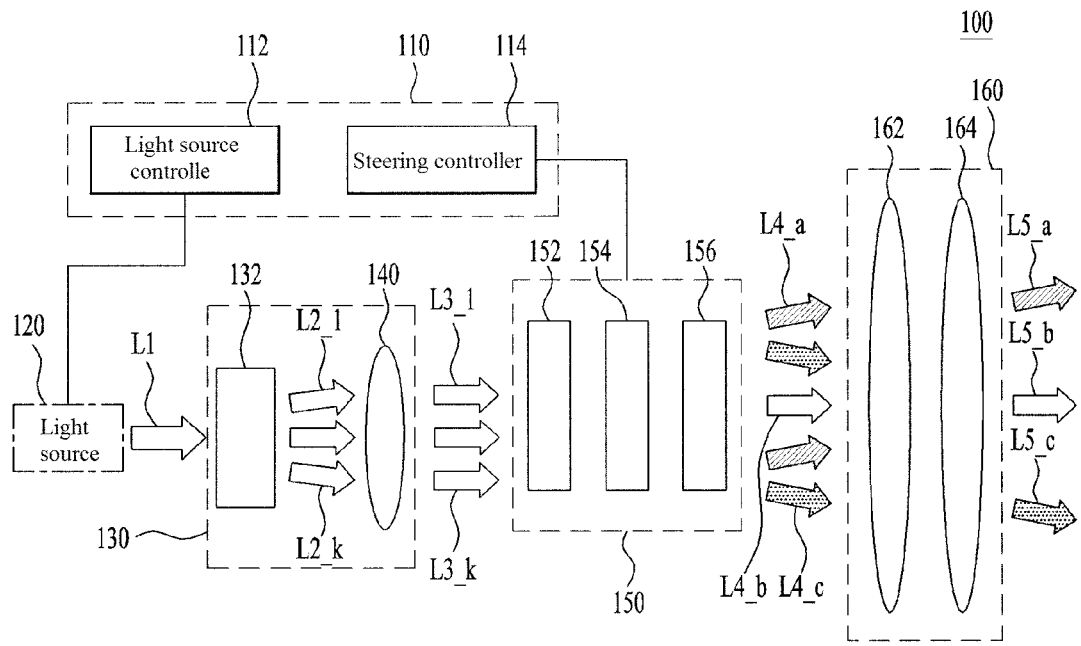
[FIG. 3]
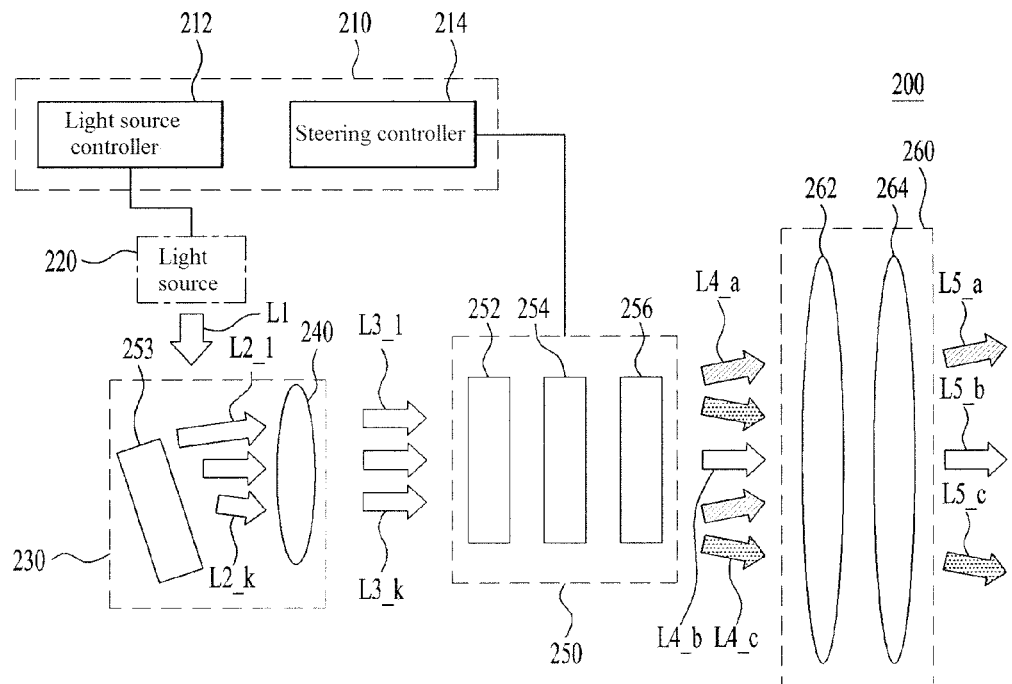

[FIG. 4]
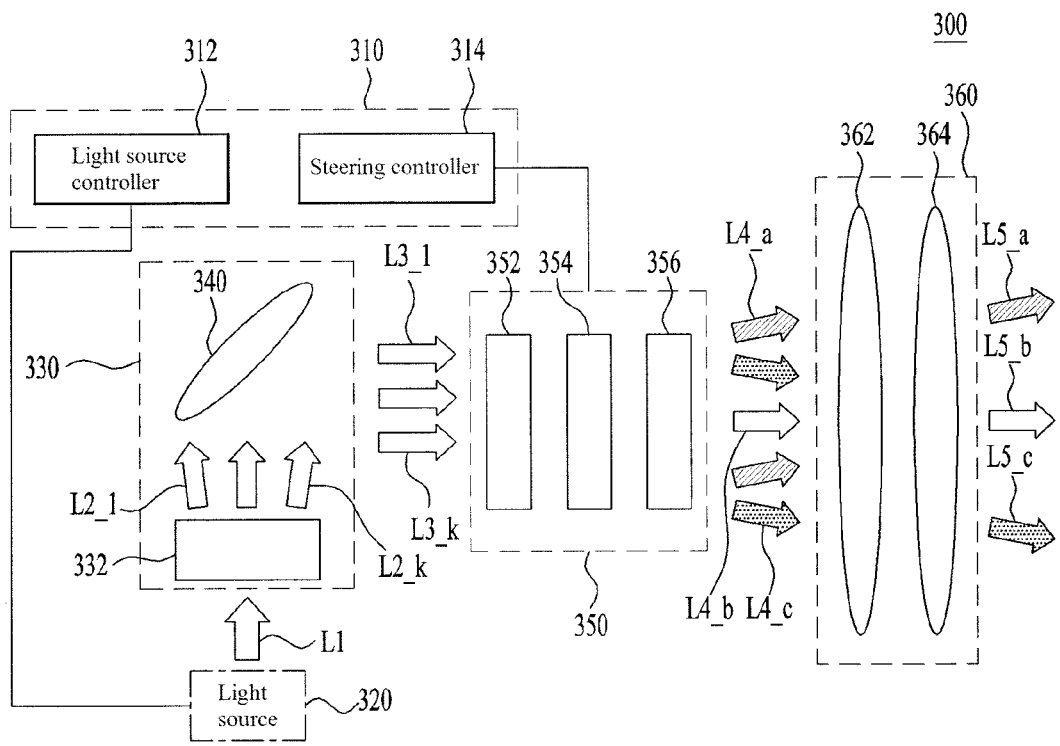
[FIG. 5]
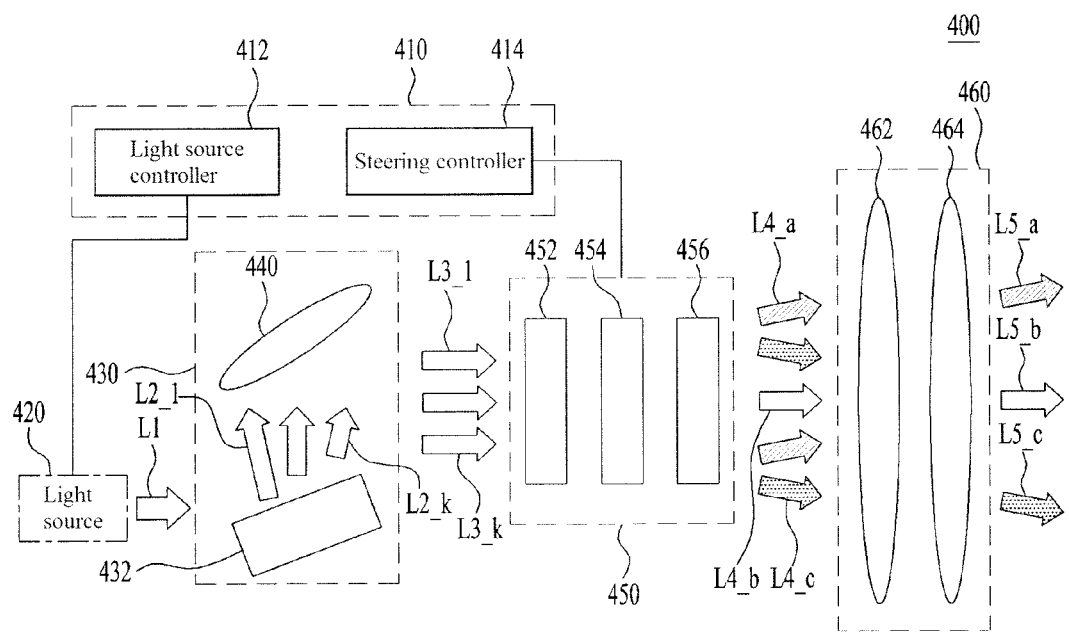

【FIG. 6】
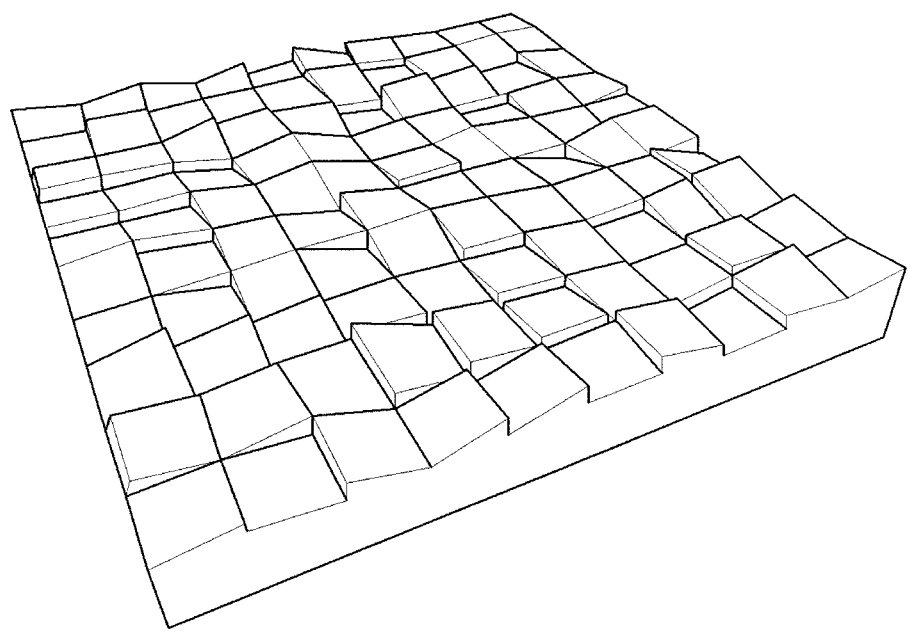

[FIG. 7]
(a)
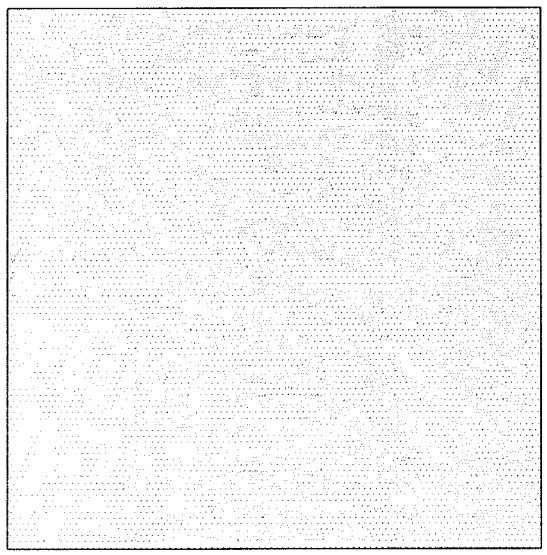
(b)

[FIG. 8]
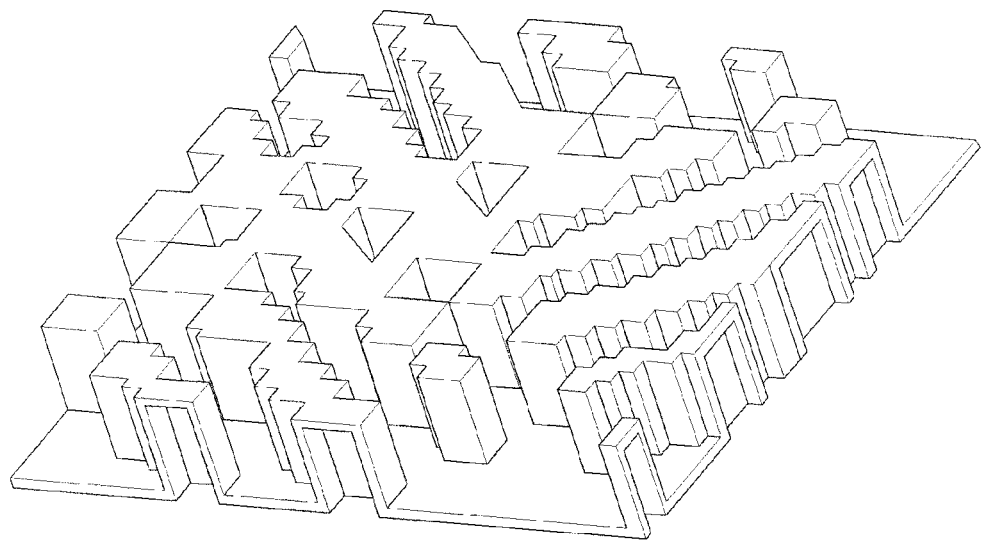

【FIG. 9】
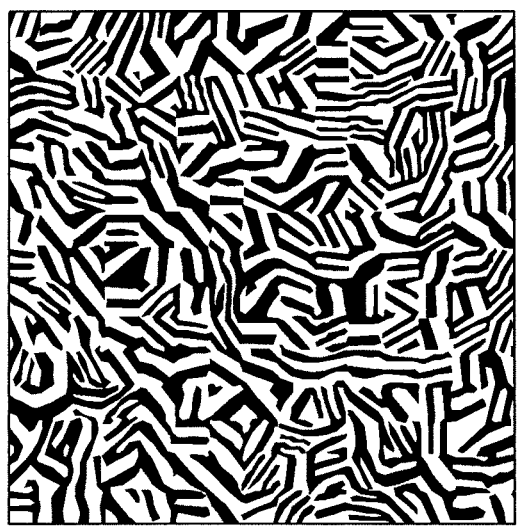
(a)
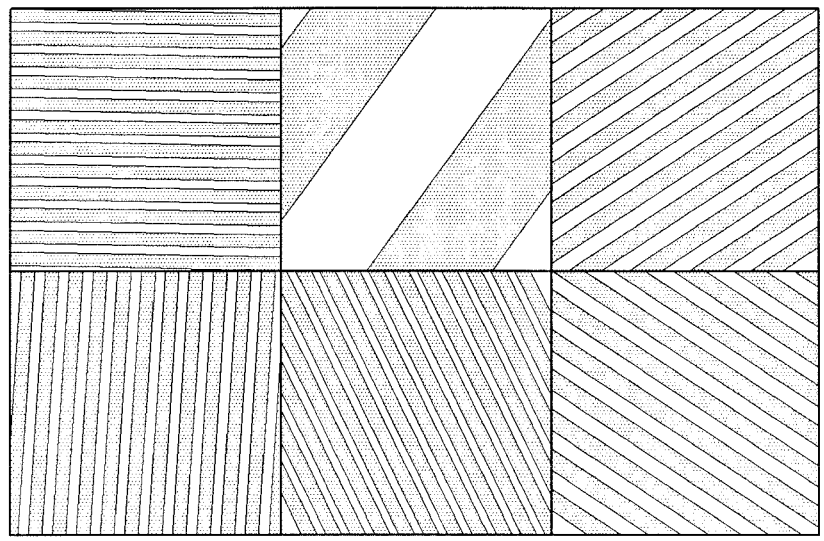
(b)

[FIG. 10]
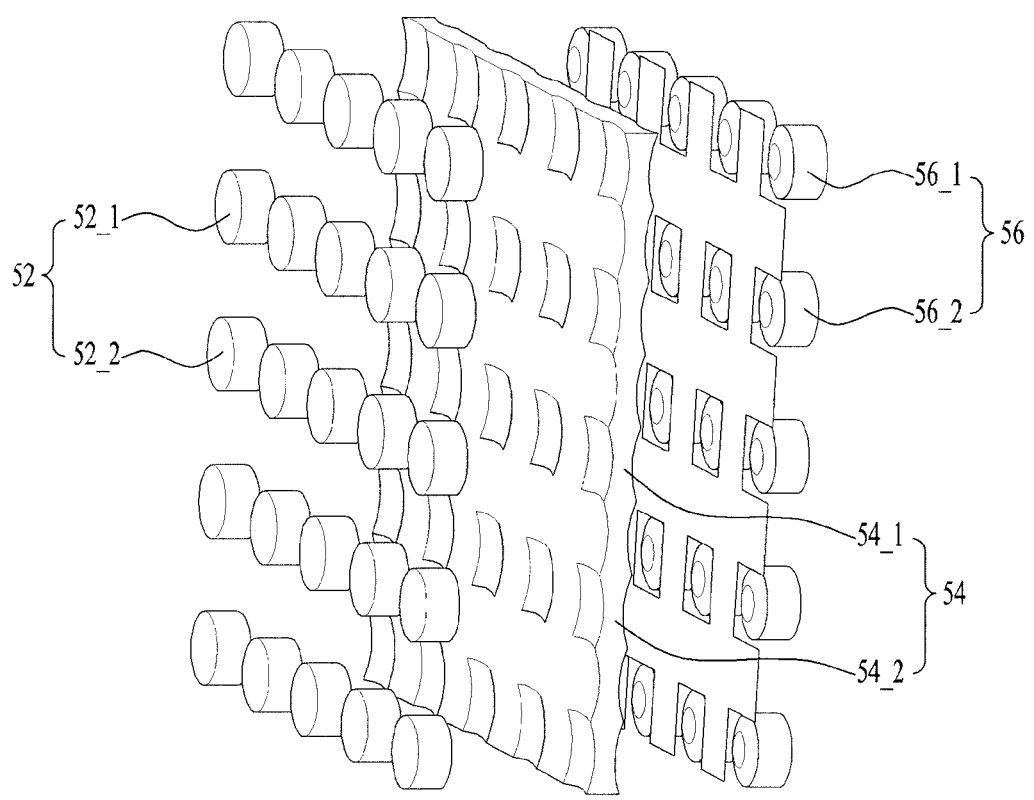

[FIG. 11]
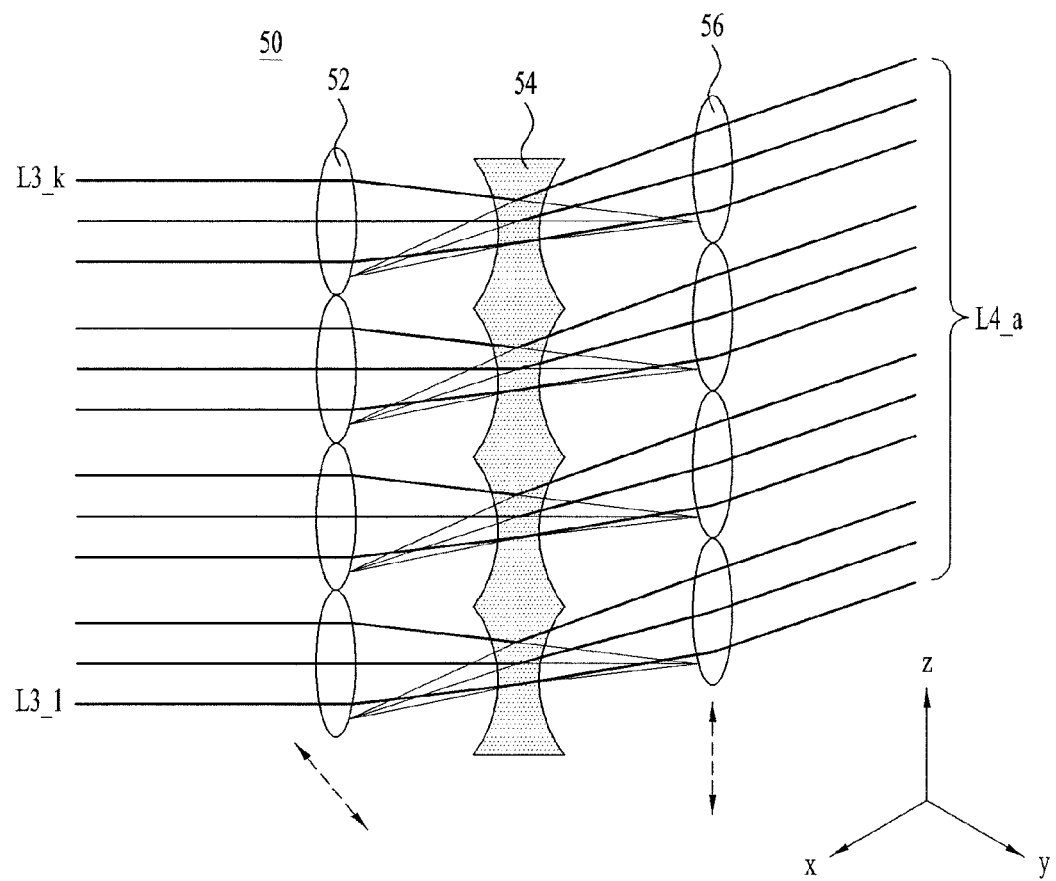

[FIG. 12]
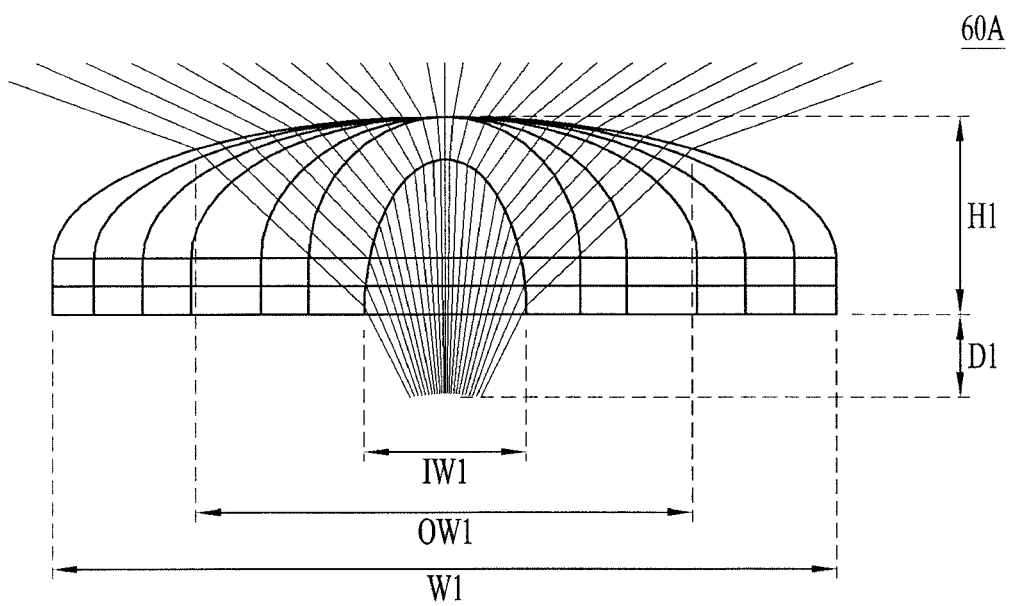

[FIG. 13]
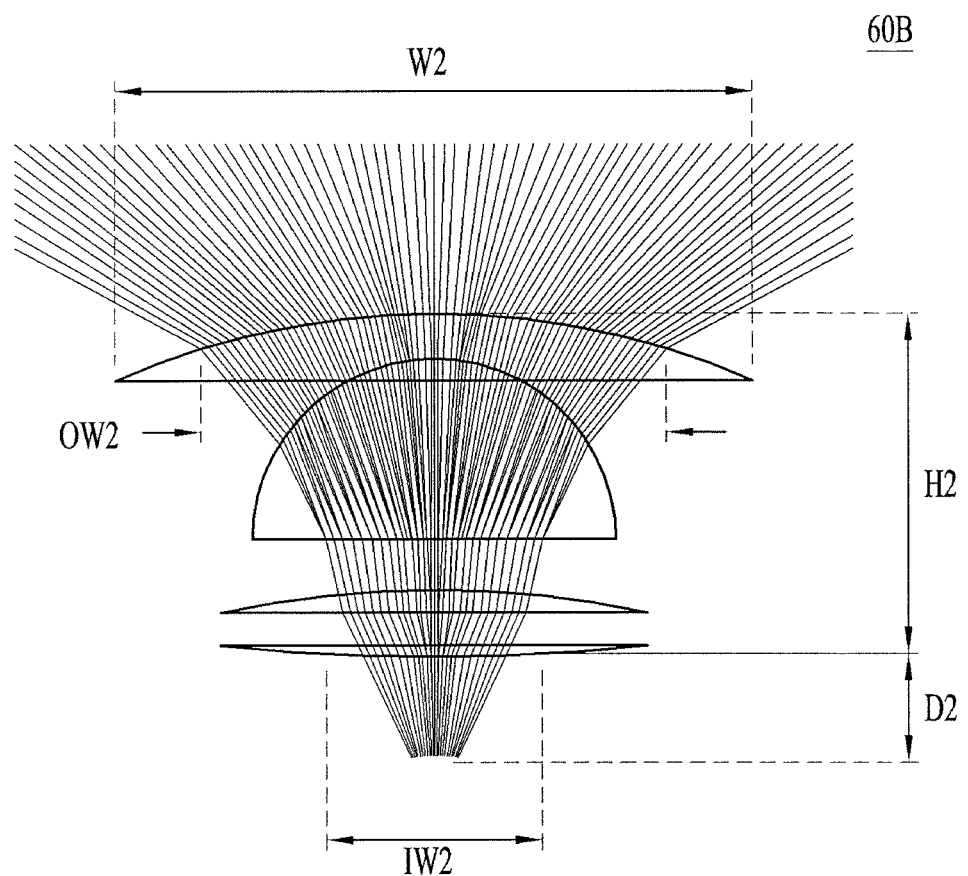

【FIG. 14】
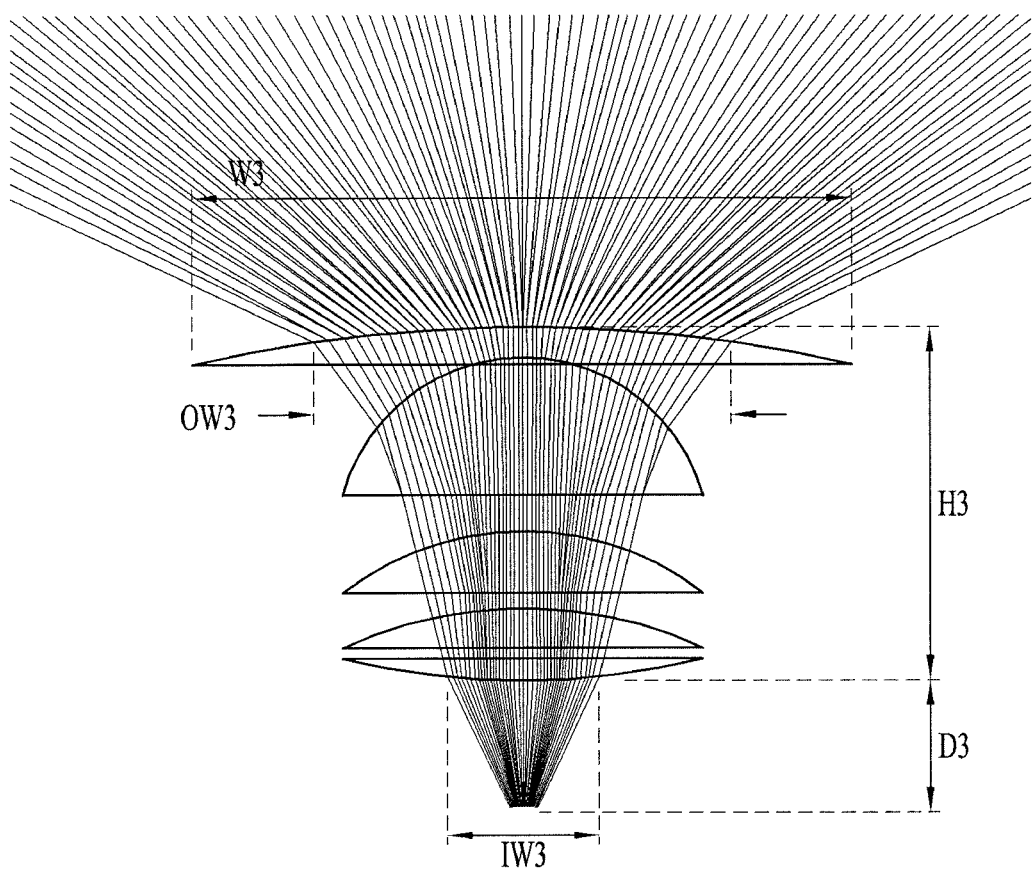

LIGHT DETECTION AND RANGING DEVICE

CROSS REFERENCE TO RELATED APPLICATIONS

This application is the National Phase of PCT/KR2016/008542 filed on Aug. 3, 2016, which claims priority under 35 U.S.C. § 119(a) to Patent Application No. 10-2015-0109456 filed in the Republic of Korea on Aug. 3, 2015, all of which are hereby expressly incorporated by reference into the present application.

TECHNICAL FIELD

The present invention relates to an optical device which can be used in a remote sensing system, and more specifically, a detection/measurement device for acquiring information about an object using radio waves or light.

BACKGROUND ART

Optical devices have used RaDAR (Radio Detection And Ranging) using radio waves, LaDAR (Laser Detection And Ranging) using laser beams, LiDAR (Light Detection And Ranging) using beams having shorter wavelengths than LaDAR, etc. Among these techniques, LiDAR (Light Detection And Ranging) radiates laser pulses to the surface of an object to be photographed and a detection range using a beam (laser) having a short wavelength corresponding to infrared light and an electromagnetic spectrum and then measures attributes of the object using pulses of a signal in response to the laser pulses. LiDAR has been used in archeology, geography, geology, aeronomy and remote sensing. Furthermore, combination of LiDAR, rapidly popularized smart media devices such as smartphones and tablet PCs, and rapidly developing mobile communication network technology satisfies personal demands of people and can be applied to transportation, hydrology, forestry, virtual tour, construction, etc.

FIG. 1 illustrates a general light detection and ranging device 10.

As shown, the general light detection and ranging device 10 emits beams generated from a plurality of light sources (not shown) to an object in multiple directions using a motor (not shown) and receives reflected light using a detector.

Here, the part that emits a plurality of beams 12 is mechanically moved in an arrow direction 20 according to the motor, and thus various restrictions are imposed on the light detection and ranging device. That is, it is difficult to secure mechanical reliability of the motor part and there is a limitation in reducing the size of the light detection and ranging device 10 because the motor is used. Furthermore, a plurality of light sources and a detector are required in order to extend a measurement range in the vertical direction. Moreover, the efficiency of the general light detection and ranging device may be deteriorated because a light-receiving unit thereof requires a condensing lens, and there is a limitation in acquiring various types of information because the device can obtain only distance information of an object.

DISCLOSURE

Technical Problem

The present invention maintains a wave front size when one beam emitted from a light source is split into a plurality of beams using an optical phase array which can perform phase control in an optical device using a laser as a light source.

In addition, the present invention can provide an optical device having field of view and beam steering for scanning an area having a certain size or more without using a plurality of light sources by maintaining a wave front size even when one beam is split into a plurality of beams.

Furthermore, the present invention can provide a small optical device which does not require a steering motor for steering a plurality of beams in a specific direction.

Moreover, the present invention can provide an optical device which includes a combination of lenses which can adjust steering angles of a plurality of beams and then increase the steering angles to increase the range of areas which can be scanned.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

An optical device according to one embodiment may include: a beam splitting unit for receiving one first beam and outputting k (k being a natural number) second beams; a beam steering unit for changing the direction of the k second beams by a first steering angle to output third beams; a lens unit for receiving the third beams, adjusting the first steering angle and outputting fourth beams; and a driving unit for controlling a first beam emission angle, wherein a wave front of the second beams is wider than that produced by dividing a wave front of the first beam by k.

In addition, the beam splitting unit may include: an optical phase array for receiving the first beam and generating the k second beams having different directivities; and a direction adjuster for individually converging the k second beams to adjust the directions of the second beams to a first direction.

Furthermore, the optical phase array may be composed of elements in an m×n matrix (m and n being natural numbers equal to or greater than 3, (m×n)≥k), and the elements may be distributed in a discrete space form with respect to a plurality of direction vectors.

Moreover, the elements may include a spherical surface, and the absolute value of the curvature of the spherical surface may be greater than 10 mm.

In addition, the elements may include uneven patterns having heights less than 1 mm.

Furthermore, the elements may have sizes more than 1.5 times the wave front of the first beam and refractive indexes in the range of 1 to 2.7.

Moreover, the value obtained by dividing the size of a beam spot of beams output from the elements by a beam spot spacing may be equal to or less than 0.5.

In addition, the optical phase array may be a reflective element physically separated from a light source device emitting the first beam or a coating film attached to the light source device.

Further, the reflective element may be a single layer or multiple layers containing at least one of Al, Au, Pt and Ag.

Moreover, the direction adjuster may be composed of a plurality of elements corresponding to the plurality of second beams, and the elements may have different curvatures according to position.

In addition, the elements may be composed of lenses and contain at least one of glass, silicon, PMMA and polycarbonate.

Further, the elements may be composed of mirrors, and reflective surfaces of the mirrors may include a single layer or multiple layers containing at least one of Al, Au, Pt and Ag.

Further, an optical device according to another embodiment may include: a beam splitting unit for receiving one first beam and outputting k (k being a natural number) second beams; a beam steering unit for changing the direction of the k second beams by a first steering angle to output third beams; a lens unit for receiving the third beams, adjusting the first steering angle and outputting fourth beams; and a driving unit for controlling a first beam emission angle, wherein the beam steering unit includes: a spot formation array for focusing the second beams to form a plurality of beam spots; a diffusion array for diffusing all or some of the plurality of beam spots and outputting the beam spots; and a steering array for changing the output of the diffusion array by the first steering angle to output the third beams.

In addition, the first steering angle may be determined in the range of 0 to ±25 degrees.

Further, the range of translational motion of the spot formation array and the steering array may be equal to or less than 2 mm, and the spot formation array and the steering array may perform translational motion in different directions.

Further, the spot formation array may include first elements in the form of a convex lens, the diffusion array may include second elements in the form of a concave lens and the steering array may include third elements in the form of a convex lens.

Further, the diameter or major axis length of the wave front of the first beam may be in the range of 100 nm to 2 mm.

An optical device according to another embodiment may include: a beam splitting unit for receiving one first beam and outputting k (k being a natural number) second beams; a beam steering unit for changing the direction of the k second beams by a first steering angle to output third beams; a lens unit for receiving the third beams, adjusting the first steering angle and outputting fourth beams; and a driving unit for controlling a first beam emission angle, wherein the lens unit includes one or more lenses or a combination of one or more lenses and a mirror and readjusts the first steering angle in the range of 0 to ±100 degrees.

In addition, the optical device may further include an aperture between the lenses, wherein the lenses have a size more than twice the beam spot size of the third beam, and the aperture has a size more than 0.5 times the beam spot size.

Further, the value obtained by dividing an incidence angle of the lens unit by a refraction angle of the lens unit on the basis of the optical axis of the third beams may be in the range of 0.1 to 100.

The aforementioned aspects of the present invention are merely parts of preferred embodiments of the present invention and various embodiments reflecting technical features of the present invention can be derived and understood by those skilled in the art on the basis of the following detailed description of the present invention.

Advantageous Effects

The optical device can split, spread or steer a beam using a device in the form of an array capable of individually processing a plurality of beams to achieve fine adjustment.

In addition, it is possible to scan a desired area using one light source instead of a plurality of light sources to reduce time and burden required for signal (data) processing, improving the efficiency of the optical device.

Furthermore, it is possible to remarkably improve emission efficiency compared to a steering device using a silicon nano device by using a combination of lenses or mirrors for beam steering.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 1 illustrates a general light detection and ranging device.

FIG. 2 illustrates a first optical device capable of performing detection and ranging using a laser.

FIG. 3 illustrates a second optical device capable of performing detection and ranging using a laser.

FIG. 4 illustrates a third optical device capable of performing detection and ranging using a laser.

FIG. 5 illustrates a fourth optical device capable of performing detection and ranging using a laser.

FIG. 6 illustrates a first optical phase array applicable to the first to fourth optical devices.

FIG. 7 illustrates the surface of the first optical phase array shown in FIG. 6.

FIG. 8 illustrates a second optical phase array applicable to the first to fourth optical devices.

FIG. 9 illustrates the surface of the second optical phase array shown in FIG. 8.

FIG. 10 illustrates a beam steering unit applicable to the first to fourth optical devices.

FIG. 11 illustrates the operation of the beam steering unit shown in FIG. 10.

FIG. 12 illustrates a first lens structure applicable to the first to fourth optical devices.

FIG. 13 illustrates a second lens structure applicable to the first to fourth optical devices.

FIG. 14 illustrates a third lens structure applicable to the first to fourth optical devices.

BEST MODE

Hereinafter, devices and various methods to which embodiments of the present invention are applied will be described in detail with reference to the drawings. The terms "module" and "unit" used to signify components are used herein to help the understanding of the components and thus they should not be considered as having specific meanings or roles.

In the following description of the embodiments, it will be understood that, when an element is referred to as being "on" or "under" another element, it can be "directly" on or under another element or can be "indirectly" formed such that an intervening element is also present. In addition, it will be understood that this expression is Intended to encompass different orientations of the elements in addition to the orientation depicted in the figures, namely, to encompass both "on" and "under".

FIG. 2 illustrates a first optical device 100 capable of performing detection and ranging using a laser.

As shown, the first optical device 100 may include a beam splitting unit 130 which receives one first beam L1 and outputs k (k being a natural number) third beams L3_1 to L3_k, a beam steering unit 150 which changes the direction of the k third beams L3_1 to L3_k by a first steering angle to output fourth beams L4_1, L4_b and L4_c, a lens unit 160 which receives the fourth beams L4_1, L4_b and L4_c and adjusts the first steering angle to output fifth beams L5_a, L5_b and L5_c, and a driving unit 110 for controlling a first beam emission angle.

The first optical device 100 may include a light source 120 emitting the first beam L1. The light source 120 may output a laser and operation thereof is controlled by a light source controller 112. The first beam L1 may be a laser having a wave front diameter or a major axis length in the range of 100 nm to 2 mm. The first optical device 100 uses LiDAR (Light Detection And Ranging) or LADAR (Laser Detection And Ranging) and differs from conventional optical devices employing RADAR (Radio Detection And Ranging) using a radio frequency (RF) or microwave in terms of the light source 120 and properties of the first beam L1 emitted from the light source. Beam processing such as beam splitting, beam steering and the like depends on the technology used by an optical device due to the properties of the first beam L1 and characteristic differences between beams.

When the first optical device 100 is mounted in another device or equipment or shares a light source of another device or equipment, the first optical device 100 may not include a separate light source.

The beam splitting unit 130 may include an optical phase array 132 which receives the first beam L1 and generates k second beams L2_1 to L2_k having different directivities, and a direction adjuster 140 which individually converges the k second beams L2_1 to L2_k to adjusts the directions of the k second beams to a first direction and then outputs k third beams L3_1 to L3_k. Here, the first direction may be an optical axis direction which is a basis of beam steering.

The optical phase array 132 may be composed of elements arranged in an m×n matrix form. Here m and n may be natural numbers equal to or greater than 3, and a product of m and n may be equal to or greater than k. The elements included in the optical phase array 132 may be distributed in a discrete space with respect to a plurality of direction vectors.

The optical phase array 132 is discriminated from a general beam splitter. While both the optical phase array 132 and the beam splitter generate a plurality of beams from a single beam in common, the beam splitter is characterized by splitting a single beam into a plurality of beams using different reflectivities/refractive indexes. Accordingly, the wave front of an incident beam can be split into as many beams as the number of emitted beams when the beam splitter is used. For example, when the size of the wave front of an incident beam is 1 and the number of emitted beams is 9, the size of the wave front of a beam output from the beam splitter can be ⅑ that of the incident beam.

The wave front of the second beams L2_1 to L2_k output from the optical phase array 132 may be wider than the area obtained by dividing the area of the wave front of the first beam L1 by k (the number of second beams). Here, the wave front of the second beams L2_1 to L2_k may correspond to lower than 50% of the wave front of the first beam L1. The optical phase array 132 generates a plurality of beams through phase control instead of dividing the wave front of the incident beam. Accordingly, the wave front of a beam output from the optical phase array 132 may have a size in the range of 1/k to ½ that of the incident beam and the density of the beam may decrease.

The optical phase array 132 may be a transmissive element which is physically separated from the light source 120, transmits the first beam L1 and generates the plurality of second beams L2_1 to L2_k. Alternatively, the optical phase array 132 may be realized in the form of a coating film that can be attached to the light source 120. The form of the optical phase array 132 may be changed according to the purpose of use or design of the optical device.

Referring to FIG. 2, the direction adjuster 140 may be composed of a plurality of elements corresponding to the plurality of second beams L2_1 to L2_k. The elements in the direction adjuster 140 may have different curvatures according to positions thereof. The plurality of second beams L2_1 to L2_k output from the optical phase array 132 may have different directivities. When a plane is scanned with the optical device 100, the direction adjuster 140 needs to align the plurality of second beams L2_1 to L2_k having different directivities in a specific direction.

The direction adjuster 140 may be distinguished from a general objective lens. This is because a plurality of elements for individually adjusting the plurality of second beams L2_1 to L2_k need to have different refractive indexes since the plurality of second beams L2_1 to L2_k input to the direction adjuster 140 may have different directivities.

The direction adjuster 140 may have a structure corresponding to optical properties of the second beams L2_1 to L2_k output from the optical phase array 132. For example, the elements in the direction adjuster 140 may be arranged in an m×n matrix form.

For example, the elements in the direction adjuster 140 may be configured in the form of a lens and may contain at least one of glass, silicon, PMMA and polycarbonate.

Referring to FIG. 2, the beam steering unit 150 may include a spot formation array 152 which focuses the plurality of third beams L3_1 to L3_k to form a plurality of beam spots, a diffusion array 154 which diffuses and outputs all or some of the plurality of beam spots, and a steering array 156 which changes the output of the diffusion array 154 by a first steering angle to output fourth beams L4_a, L4_b and L4_c. For example, a maximum of the first steering angle may be approximately ±25 degrees. That is, the directions of the fourth beams L4_a, L4_b and L4_c generated by the beam steering unit 150 may be changed by approximately ±25 degrees from the direction of the plurality of third beams L3_1 to L3_k input to the beam steering unit 150.

The fourth beam L4_a, L4_b or L4_c output from the beam steering unit 150 has deviated from the optical axis of the third beams L3_1 to L3_k by the first steering angle. If the first steering angle is 0 degrees, the fourth beam L4_b is parallel to the optical axes of the third beams L3_1 to L3_k. If the first steering angle is 20 degrees (or −20 degrees), the fourth beam L4_a or L4_c deviates from the optical axes of the third beams L3_1 to L3_k in a specific direction.

Control of the first steering angle may be determined by a steering controller 114 in the driving unit 110. The spot formation array 152 and the steering array 156 perform translational motion according to the steering controller 114. For example, the range of translational motion of the spot formation array 152 and the steering array 156 may be less than 2 mm and the spot formation array 152 and the steering array 156 may perform translational motions in different directions.

All of the spot formation array 152, the diffusion array 154 and the steering array 156 may have an m×n matrix structure. For example, the spot formation array 152 may include first elements in the form of a convex lens, the diffusion array 154 may include second elements in the form of a concave lens, and the steering array 156 may include third elements in the form of a convex lens. In this case, the first, second and third elements may have curvatures of more than 25 mm. In addition, a distance between the center of each element and the center of a neighboring element may correspond to a value 0.5 times or twice a beam spot spacing.

Some of the spot formation array 152, the diffusion array 154 and the steering array 156 may not include elements in the form of a lens. For example, the diffusion array 154 may include apertures having sizes more than 0.5 times the size of a beam spot. In addition, the diffusion array 154 may be configured as a combination of lenses and apertures in which the lenses are provided at the center and the apertures are provided at the edge. When the diffusion array 154 includes the apertures, the apertures may have different diameters according to positions in the array.

Referring to FIG. 2, the lens unit 160 may include at least one lens 162 and 164 or a combination of at least one lens and a mirror. The lens unit 160 may readjust the first steering angle of the beam steering unit 150 in the range of 0 to ±100 degrees. For example, when the first steering angle of the beam steering unit 150 is 25 degrees, the lens unit 160 can readjust the first steering angle of 25 degrees to 100 degrees (about four times). When the first steering angle of the beam steering unit 150 is 0 degrees, the lens unit 160 may maintain the first steering angle as 0 degrees.

The performance and structure of the lens unit 160 may vary according to the purpose of use and required performance of the optical device 100. As factors determining the performance of the lens unit 160, field of view (FOV), uniformity of angle, beam divergence angle, etc. can be exemplified. For example, the lens unit 160 may be designed to have FOV of 120 degrees. When the lens unit 160 is configured using multiple lenses, it is possible to easily satisfy requirements (i.e., FOV) of the optical device 100 as compared to a case in which the lens unit 160 is configured using a single lens.

For example, the lens unit 160 may further include an aperture (not shown) formed between the lenses 162 and 164. In this case, the lenses 162 and 164 may have a size more than twice the beam spot of the fourth beams L4_$a$, L4_$b$ and L4_$c$ and the aperture may have a size more than 0.5 times the beam spot. The sizes of the lenses 162 and 164 and the aperture may affect the sizes of the lens unit 160 and the optical device 100.

In the lens unit 160 including at least one lens, the value obtained by dividing the incidence angle (i.e., a steering angle of the fourth beams L4_$a$, L4_$b$ and L4_$c$) of the lens unit 160 by the refraction angle (i.e., a steering angle of the fifth beams L5_$a$, L5_$b$ and L5_$c$) of the lens unit 160 on the basis of the optical axes of the third beams L3_1 to L3_$k$ may be in the range of 0.1 to 100.

FIG. 3 illustrates a second optical device 200 capable of performing detection and ranging using a laser.

As shown, the second optical device 200 may include a beam splitting unit 230 which receives one first beam L1 and outputs k (k being a natural number) third beams L3_1 to L3_$k$, a beam steering unit 250 which changes the direction of the k third beams L3_1 to L3_$k$ by a first steering angle to output fourth beams L4_1, L4_$b$ and L4_$c$, a lens unit 260 which receives the fourth beams L4_1, L4_$b$ and L4_$c$ and adjusts the first steering angle to output fifth beams L5_$a$, L5_$b$ and L5_$c$, and a driving unit 210 for controlling a first beam emission angle.

The second optical device 200 may include a light source 220 emitting the first beam L1. The light source 220 may output a laser and operation thereof is controlled by a light source controller 212. The first beam L1 may be a laser having a wave front diameter or a major axis length in the range of 100 nm to 2 mm. The second optical device 200 uses LiDAR (Light Detection And Ranging) or LADAR (Laser Detection And Ranging) and differs from conventional optical devices employing RADAR (Radio Detection And Ranging) using a radio frequency (RF) or microwave in terms of the light source 220 and properties of the first beam L1 emitted from the light source. Beam processing such as beam splitting, beam steering and the like depends on the technology used by an optical device due to the properties of the first beam L1 and characteristic differences between beams.

When the second optical device 200 is mounted in another device or equipment or shares a light source of another device or equipment, the first optical device 100 may not include a separate light source.

The beam splitting unit 230 may include an optical phase array 232 which receives the first beam L1 and generates k second beams L2_1 to L2_$k$ having different directivities, and a direction adjuster 240 which individually converges the k second beams L2_1 to L2_$k$ to adjusts the directions of the k second beams to a first direction and then outputs k third beams L3_1 to L3_$k$. Here, the first direction may be an optical axis direction which is a basis of beam steering.

The optical phase array 232 may be composed of elements arranged in an m×n matrix. Here m and n may be natural numbers equal to or greater than 3, and a product of m and n may be equal to or greater than k. The elements included in the optical phase array 232 may be distributed in a discrete space with respect to a plurality of direction vectors.

The optical phase array 232 is discriminated from a general beam splitter. While both the optical phase array 232 and the beam splitter generate a plurality of beams from a single beam in common, the beam splitter is characterized by splitting a single beam into a plurality of beams using different reflectivities/refractive indexes. Accordingly, the wave front of an incident beam can be split into as many beams as the number of emitted beams when the beam splitter is used. For example, when the size of the wave front of an incident beam is 1 and the number of emitted beams is 9, the size of the wave front of a beam output from the beam splitter can be ⅑ that of the incident beam.

The wave front of the second beams L2_1 to L2_$k$ output from the optical phase array 232 may be wider than the area obtained by dividing the area of the wave front of the first beam L1 by k (the number of second beams). Here, the wave front of the second beams L2_1 to L2_$k$ may correspond to lower than 50% of the wave front of the first beam L1. The optical phase array 232 generates a plurality of beams through phase control instead of dividing the wave front of the incident beam. Accordingly, the wave front of a beam output from the optical phase array 232 may have a size in the range of 1/k to ½ that of the incident beam and the density of the beam may decrease.

The optical phase array 232 may be a reflective element which is physically separated from the light source 220, reflects the first beam L1 and generates the plurality of second beams L2_1 to L2_k. The form of the optical phase array 232 may be changed according to the purpose of use or design of the optical device.

Referring to FIG. 3, the direction adjuster 240 may be composed of a plurality of elements corresponding to the plurality of second beams L2_1 to L2_k. The elements in the direction adjuster 240 may have different curvatures according to positions thereof. The plurality of second beams L2_1 to L2_k output from the optical phase array 232 may have different directivities. When a plane is scanned with the optical device 200, the direction adjuster 240 needs to align the plurality of second beams L2_1 to L2_k having different directivities in a specific direction.

The direction adjuster 240 may be distinguished from a general objective lens. This is because a plurality of elements for individually adjusting the plurality of second beams L2_1 to L2_k need to have different refractive indexes since the plurality of second beams L2_1 to L2_k input to the direction adjuster 240 may have different directivities.

The direction adjuster 240 may have a structure corresponding to optical properties of the second beams L2_1 to L2_k output from the optical phase array 232. For example, the elements in the direction adjuster 240 may be arranged in an m×n matrix.

For example, the elements in the direction adjuster 240 may be configured in the form of a lens and may contain at least one of glass, silicon, PMMA and polycarbonate.

Referring to FIG. 3, the beam steering unit 250 may include a spot formation array 252 which focuses the plurality of third beams L3_1 to L3_k to form a plurality of beam spots, a diffusion array 254 which diffuses and outputs all or some of the plurality of beam spots, and a steering array 256 which changes the output of the diffusion array 254 by a first steering angle to output fourth beams L4_a, L4_b and L4_c. For example, a maximum of the first steering angle may be approximately ±25 degrees. That is, the directions of the fourth beams L4_a, L4_b and L4_c generated by the beam steering unit 250 may be changed by approximately ±25 degrees from the direction of the plurality of third beams L3_1 to L3_k input to the beam steering unit 250.

The fourth beam L4_a, L4_b or L4_c output from the beam steering unit 250 has deviated from the optical axis of the third beams L3_1 to L3_k by the first steering angle. If the first steering angle is 0 degrees, the fourth beam L4_b is parallel to the optical axes of the third beams L3_1 to L3_k. If the first steering angle is 20 degrees (or −20 degrees), the fourth beam L4_a or L4_c deviates from the optical axes of the third beams L3_1 to L3_k in a specific direction.

Control of the first steering angle may be determined by a steering controller 214 in the driving unit 210. The spot formation array 252 and the steering array 256 perform translational motion according to the steering controller 214. For example, the range of translational motion of the spot formation array 252 and the steering array 256 may be less than 2 mm and the spot formation array 252 and the steering array 256 may perform translational motions in different directions.

All of the spot formation array 252, the diffusion array 254 and the steering array 256 may have an m×n matrix structure. For example, the spot formation array 252 may include first elements in the form of a convex lens, the diffusion array 254 may include second elements in the form of a concave lens, and the steering array 256 may include third elements in the form of a convex lens. In this case, the first, second and third elements may have curvatures of more than 25 mm. In addition, a distance between the center of each element and the center of a neighboring element may correspond to a value 0.5 times or twice a beam spot spacing.

Some of the spot formation array 252, the diffusion array 254 and the steering array 256 may not include elements in the form of a lens. For example, the diffusion array 254 may include apertures having sizes more than 0.5 times the size of a beam spot. In addition, the diffusion array 254 may be configured as a combination of lenses and apertures in which the lenses are provided at the center and the apertures are provided at the edge. When the diffusion array 254 includes the apertures, the apertures may have different diameters according to positions in the array.

Referring to FIG. 3, the lens unit 260 may include at least one lens 262 and 264 or a combination of at least one lens and a mirror. The lens unit 260 may readjust the first steering angle of the beam steering unit 250 in the range of 0 to ±100 degrees. For example, when the first steering angle of the beam steering unit 250 is 25 degrees, the lens unit 260 can readjust the first steering angle of 25 degrees to 100 degrees (about four times). When the first steering angle of the beam steering unit 250 is 0 degrees, the lens unit 260 may maintain the first steering angle as 0 degrees.

The performance and structure of the lens unit 260 may vary according to the purpose of use and required performance of the optical device 200. As factors determining the performance of the lens unit 260, field of view (FOV), uniformity of angle, beam divergence angle, etc. can be exemplified. For example, the lens unit 260 may be designed to have FOV of 120 degrees. When the lens unit 260 is configured using multiple lenses, it is possible to easily satisfy requirements (i.e., FOV) of the optical device 200 as compared to a case in which the lens unit 260 is configured using a single lens.

For example, the lens unit 260 may further include an aperture (not shown) formed between the lenses 262 and 264. In this case, the lenses 262 and 264 may have a size more than twice the beam spot of the fourth beams L4_a, L4_b and L4_c and the aperture may have a size more than 0.5 times the beam spot. The sizes of the lenses 262 and 264 and the aperture may affect the sizes of the lens unit 260 and the optical device 200.

In the lens unit 260 including at least one lens, the value obtained by dividing the incidence angle (i.e., a steering angle of the fourth beams L4_a, L4_b and L4_c) of the lens unit 260 by the refraction angle (i.e., a steering angle of the fifth beams L5_a, L5_b and L5_c) of the lens unit 260 on the basis of the optical axes of the third beams L3_1 to L3_k may be in the range of 0.1 to 100.

FIG. 4 illustrates a third optical device 300 capable of performing detection and ranging using a laser.

As shown, the third optical device 300 may include a beam splitting unit 330 which receives one first beam L1 and outputs k (k being a natural number) third beams L3_1 to L3_k, a beam steering unit 350 which changes the direction of the k third beams L3_1 to L3_k by a first steering angle to output fourth beams L4_1, L4_b and L4_c, a lens unit 360 which receives the fourth beams L4_1, L4_b and L4_c and adjusts the first steering angle to output fifth beams L5_a, L5_b and L5_c, and a driving unit 310 for controlling a first beam emission angle.

The third optical device 300 may include a light source 320 emitting the first beam L1. The light source 320 may output a laser and operation thereof is controlled by a light source controller 312. The first beam L1 may be a laser having a wave front diameter or a major axis length in the range of 100 nm to 2 mm. The third optical device 300 uses LiDAR (Light Detection And Ranging) or LADAR (Laser Detection And Ranging) and differs from conventional optical devices employing RADAR (Radio Detection And Ranging) using a radio frequency (RF) or microwave in terms of the light source 320 and properties of the first beam L1 emitted from the light source. Beam processing such as beam splitting, beam steering and the like depends on the technology used by an optical device due to the properties of the first beam L1 and characteristic differences between beams.

When the third optical device 300 is mounted in another device or equipment or shares a light source of another device or equipment, the first optical device 100 may not include a separate light source.

The beam splitting unit 330 may include an optical phase array 332 which receives the first beam L1 and generates k second beams L2_1 to L2_$k$ having different directivities, and a direction adjuster 340 which individually converges the k second beams L2_1 to L2_$k$ to adjusts the directions of the k second beams to a first direction and then outputs k third beams L3_1 to L3_$k$. Here, the first direction may be an optical axis direction which is a basis of beam steering.

The optical phase array 332 may be composed of elements arranged in an m×n matrix. Here m and n may be natural numbers equal to or greater than 3, and a product of m and n may be equal to or greater than k. The elements included in the optical phase array 332 may be distributed in a discrete space with respect to a plurality of direction vectors.

The optical phase array 332 is discriminated from a general beam splitter. While both the optical phase array 332 and the beam splitter generate a plurality of beams from a single beam in common, the beam splitter is characterized by splitting a single beam into a plurality of beams using different reflectivities/refractive indexes. Accordingly, the wave front of an incident beam can be split into as many beams as the number of emitted beams when the beam splitter is used. For example, when the size of the wave front of an incident beam is 1 and the number of emitted beams is 9, the size of the wave front of a beam output from the beam splitter can be ⅑ that of the incident beam.

The wave front of the second beams L2_1 to L2_$k$ output from the optical phase array 332 may be wider than the area obtained by dividing the area of the wave front of the first beam L1 by k (the number of second beams). Here, the wave front of the second beams L2_1 to L2_$k$ may correspond to lower than 50% of the wave front of the first beam L1. The optical phase array 332 generates a plurality of beams through phase control instead of dividing the wave front of the incident beam. Accordingly, the wave front of a beam output from the optical phase array 332 may have a size in the range of 1/k to ½ that of the incident beam and the density of the beam may decrease.

The optical phase array 332 may be a transmissive element which is physically separated from the light source 320, transmits the first beam L1 and generates the plurality of second beams L2_1 to L2_$k$. Alternatively, the optical phase array 332 may be realized in the form of a coating film that can be attached to the light source 320. The form of the optical phase array 332 may be changed according to the purpose of use or design of the optical device.

Referring to FIG. 4, the direction adjuster 340 may be composed of a plurality of elements corresponding to the plurality of second beams L2_1 to L2_$k$. The elements in the direction adjuster 340 may have different curvatures according to positions thereof. The plurality of second beams L2_1 to L2_$k$ output from the optical phase array 332 may have different directivities. When a plane is scanned with the optical device 300, the direction adjuster 340 needs to align the plurality of second beams L2_1 to L2_$k$ having different directivities in a specific direction.

The direction adjuster 340 may be distinguished from a general objective lens. This is because a plurality of elements for individually adjusting the plurality of second beams L2_1 to L2_$k$ need to have different refractive indexes since the plurality of second beams L2_1 to L2_$k$ input to the direction adjuster 340 may have different directivities.

The direction adjuster 340 may have a structure corresponding to optical properties of the second beams L2_1 to L2_$k$ output from the optical phase array 332. For example, the elements in the direction adjuster 340 may be arranged in an m×n matrix.

For example, the elements in the direction adjuster 340 may be configured in the form of a mirror. In this case, the reflective surface of the mirror may include a single layer or a multiple layers containing at least one of Al, Au, Pt and Ag.

Referring to FIG. 4, the beam steering unit 350 may include a spot formation array 352 which focuses the plurality of third beams L3_1 to L3_$k$ to form a plurality of beam spots, a diffusion array 354 which diffuses and outputs all or some of the plurality of beam spots, and a steering array 356 which changes the output of the diffusion array 354 by a first steering angle to output fourth beams L4_$a$, L4_$b$ and L4_$c$. For example, a maximum of the first steering angle may be approximately ±25 degrees. That is, the directions of the fourth beams L4_$a$, L4_$b$ and L4_$c$ generated by the beam steering unit 350 may be changed by approximately ±25 degrees from the direction of the plurality of third beams L3_1 to L3_$k$ input to the beam steering unit 350.

The fourth beam L4_$a$, L4_$b$ or L4_$c$ output from the beam steering unit 350 has deviated from the optical axis of the third beams L3_1 to L3_$k$ by the first steering angle. If the first steering angle is 0 degrees, the fourth beam L4_$b$ is parallel to the optical axes of the third beams L3_1 to L3_$k$. If the first steering angle is 20 degrees (or −20 degrees), the fourth beam L4_$a$ or L4_$c$ deviates from the optical axes of the third beams L3_1 to L3_$k$ in a specific direction.

Control of the first steering angle may be determined by a steering controller 314 in the driving unit 310. The spot formation array 352 and the steering array 356 perform translational motion according to the steering controller 314. For example, the range of translational motion of the spot formation array 352 and the steering array 356 may be less than 2 mm and the spot formation array 352 and the steering array 356 may perform translational motions in different directions.

All of the spot formation array 352, the diffusion array 354 and the steering array 356 may have an m×n matrix structure. For example, the spot formation array 352 may include first elements in the form of a convex lens, the diffusion array 354 may include second elements in the form of a concave lens, and the steering array 356 may include third elements in the form of a convex lens. In this case, the first, second and third elements may have curvatures of more than 25 mm. In addition, a distance between the center of each element and the center of a neighboring element may correspond to a value 0.5 times or twice a beam spot spacing.

Some of the spot formation array 352, the diffusion array 354 and the steering array 356 may not include elements in the form of a lens. For example, the diffusion array 354 may include apertures having sizes more than 0.5 times the size of a beam spot. In addition, the diffusion array 354 may be configured as a combination of lenses and apertures in which the lenses are provided at the center and the apertures are provided at the edge. When the diffusion array 354 includes the apertures, the apertures may have different diameters according to positions in the array.

Referring to FIG. 4, the lens unit 360 may include at least one lens 362 and 364 or a combination of at least one lens and a mirror. The lens unit 360 may readjust the first steering angle of the beam steering unit 350 in the range of 0 to ±100 degrees. For example, when the first steering angle of the beam steering unit 350 is 25 degrees, the lens unit 360 can readjust the first steering angle of 25 degrees to 100 degrees (about four times). When the first steering angle of the beam steering unit 350 is 0 degrees, the lens unit 360 may maintain the first steering angle as 0 degrees.

The performance and structure of the lens unit 360 may vary according to the purpose of use and required performance of the optical device 300. As factors determining the performance of the lens unit 360, field of view (FOV), uniformity of angle, beam divergence angle, etc. can be exemplified. For example, the lens unit 360 may be designed to have FOV of 120 degrees. When the lens unit 360 is configured using multiple lenses, it is possible to easily satisfy requirements (i.e., FOV) of the optical device 300 as compared to a case in which the lens unit 360 is configured using a single lens.

For example, the lens unit 360 may further include an aperture (not shown) formed between the lenses 362 and 364. In this case, the lenses 362 and 364 may have a size more than twice the beam spot of the fourth beams $L4\_a$, $L4\_b$ and $L4\_c$ and the aperture may have a size more than 0.5 times the beam spot. The sizes of the lenses 362 and 364 and the aperture may affect the sizes of the lens unit 360 and the optical device 300.

In the lens unit 360 including at least one lens, the value obtained by dividing the incidence angle (i.e., a steering angle of the fourth beams $L4\_a$, $L4\_b$ and $L4\_c$) of the lens unit 360 by the refraction angle (i.e., a steering angle of the fifth beams $L5\_a$, $L5\_b$ and $L5\_c$) of the lens unit 360 on the basis of the optical axes of the third beams $L3\_1$ to $L3\_k$ may be in the range of 0.1 to 100.

FIG. 5 illustrates a fourth optical device 400 capable of performing detection and ranging using a laser.

As shown, the fourth optical device 400 may include a beam splitting unit 430 which receives one first beam L1 and outputs k (k being a natural number) third beams $L3\_1$ to $L3\_k$, a beam steering unit 450 which changes the direction of the k third beams $L3\_1$ to $L3\_k$ by a first steering angle to output fourth beams $L4\_1$, $L4\_b$ and $L4\_c$, a lens unit 460 which receives the fourth beams $L4\_1$, $L4\_b$ and $L4\_c$ and adjusts the first steering angle to output fifth beams $L5\_a$, $L5\_b$ and $L5\_c$, and a driving unit 410 for controlling a first beam emission angle.

The fourth optical device 400 may include a light source 420 emitting the first beam L1. The light source 420 may output a laser and operation thereof is controlled by a light source controller 412. The first beam L1 may be a laser having a wave front diameter or a major axis length in the range of 100 nm to 2 mm. The fourth optical device 400 uses LiDAR (Light Detection And Ranging) or LADAR (Laser Detection And Ranging) and differs from conventional optical devices employing RADAR (Radio Detection And Ranging) using a radio frequency (RF) or microwave in terms of the light source 420 and properties of the first beam L1 emitted from the light source. Beam processing such as beam splitting, beam steering and the like depends on the technology used by an optical device due to the properties of the first beam L1 and characteristic differences between beams.

When the fourth optical device 400 is mounted in another device or equipment or shares a light source of another device or equipment, the first optical device 100 may not include a separate light source.

The beam splitting unit 430 may include an optical phase array 432 which receives the first beam L1 and generates k second beams $L2\_1$ to $L2\_k$ having different directivities, and a direction adjuster 440 which individually converges the k second beams $L2\_1$ to $L2\_k$ to adjusts the directions of the k second beams to a first direction and then outputs k third beams $L3\_1$ to $L3\_k$. Here, the first direction may be an optical axis direction which is a basis of beam steering.

The optical phase array 432 may be composed of elements arranged in an m×n matrix. Here m and n may be natural numbers equal to or greater than 3, and a product of m and n may be equal to or greater than k. The elements included in the optical phase array 432 may be distributed in a discrete space with respect to a plurality of direction vectors.

The optical phase array 432 is discriminated from a general beam splitter. While both the optical phase array 432 and the beam splitter generate a plurality of beams from a single beam in common, the beam splitter is characterized by splitting a single beam into a plurality of beams using different reflectivities/refractive indexes. Accordingly, the wave front of an incident beam can be split into as many beams as the number of emitted beams when the beam splitter is used. For example, when the size of the wave front of an incident beam is 1 and the number of emitted beams is 9, the size of the wave front of a beam output from the beam splitter can be ⅑ that of the incident beam.

The wave front of the second beams $L2\_1$ to $L2\_k$ output from the optical phase array 432 may be wider than the area obtained by dividing the area of the wave front of the first beam L1 by k (the number of second beams). Here, the wave front of the second beams $L2\_1$ to $L2\_k$ may correspond to lower than 50% of the wave front of the first beam L1. The optical phase array 432 generates a plurality of beams through phase control instead of dividing the wave front of the incident beam. Accordingly, the wave front of a beam output from the optical phase array 432 may have a size in the range of 1/k to ½ that of the incident beam and the density of the beam may decrease.

The optical phase array 432 may be a reflective element which is physically separated from the light source 420, reflects the first beam L1 and generates the plurality of second beams $L2\_1$ to $L2\_k$. The form of the optical phase array 432 may be changed according to the purpose of use or design of the optical device.

Referring to FIG. 5, the direction adjuster 440 may be composed of a plurality of elements corresponding to the plurality of second beams $L2\_1$ to $L2\_k$. The elements in the direction adjuster 440 may have different curvatures according to positions thereof. The plurality of second beams $L2\_1$ to $L2\_k$ output from the optical phase array 432 may have different directivities. When a plane is scanned with the optical device 400, the direction adjuster 440 needs to align the plurality of second beams $L2\_1$ to $L2\_k$ having different directivities in a specific direction.

The direction adjuster 440 may be distinguished from a general objective lens. This is because a plurality of elements for individually adjusting the plurality of second beams L2_1 to L2_k need to have different refractive indexes since the plurality of second beams L2_1 to L2_k input to the direction adjuster 440 may have different directivities.

The direction adjuster 440 may have a structure corresponding to optical properties of the second beams L2_1 to L2_k output from the optical phase array 432. For example, the elements in the direction adjuster 440 may be arranged in an m×n matrix.

For example, the elements in the direction adjuster 440 may be configured in the form of a mirror. In this case, the reflective surface of the mirror may include a single layer or a multiple layers containing at least one of Al, Au, Pt and Ag.

Referring to FIG. 5, the beam steering unit 450 may include a spot formation array 452 which focuses the plurality of third beams L3_1 to L3_k to form a plurality of beam spots, a diffusion array 454 which diffuses and outputs all or some of the plurality of beam spots, and a steering array 456 which changes the output of the diffusion array 454 by a first steering angle to output fourth beams L4_a, L4_b and L4_c. For example, a maximum of the first steering angle may be approximately ±25 degrees. That is, the directions of the fourth beams L4_a, L4_b and L4_c generated by the beam steering unit 450 may be changed by approximately ±25 degrees from the direction of the plurality of third beams L3_1 to L3_k input to the beam steering unit 450.

The fourth beam L4_a, L4_b or L4_c output from the beam steering unit 450 has deviated from the optical axis of the third beams L3_1 to L3_k by the first steering angle. If the first steering angle is 0 degrees, the fourth beam L4_b is parallel to the optical axes of the third beams L3_1 to L3_k. If the first steering angle is 20 degrees (or −20 degrees), the fourth beam L4_a or L4_c deviates from the optical axes of the third beams L3_1 to L3_k in a specific direction.

Control of the first steering angle may be determined by a steering controller 414 in the driving unit 410. The spot formation array 452 and the steering array 456 perform translational motion according to the steering controller 414. For example, the range of translational motion of the spot formation array 452 and the steering array 456 may be less than 2 mm and the spot formation array 452 and the steering array 456 may perform translational motions in different directions.

All of the spot formation array 452, the diffusion array 454 and the steering array 456 may have an m×n matrix structure. For example, the spot formation array 452 may include first elements in the form of a convex lens, the diffusion array 454 may include second elements in the form of a concave lens, and the steering array 456 may include third elements in the form of a convex lens. In this case, the first, second and third elements may have curvatures of more than 25 mm. In addition, a distance between the center of each element and the center of a neighboring element may correspond to a value 0.5 times or twice a beam spot spacing.

Some of the spot formation array 452, the diffusion array 454 and the steering array 456 may not include elements in the form of a lens. For example, the diffusion array 454 may include apertures having sizes more than 0.5 times the size of a beam spot. In addition, the diffusion array 454 may be configured as a combination of lenses and apertures in which the lenses are provided at the center and the apertures are provided at the edge. When the diffusion array 354 includes the apertures, the apertures may have different diameters according to positions in the array.

Referring to FIG. 5, the lens unit 460 may include at least one lens 462 and 464 or a combination of at least one lens and a mirror. The lens unit 460 may readjust the first steering angle of the beam steering unit 450 in the range of 0 to ±100 degrees. For example, when the first steering angle of the beam steering unit 450 is 25 degrees, the lens unit 460 can readjust the first steering angle of 25 degrees to 100 degrees (about four times). When the first steering angle of the beam steering unit 450 is 0 degrees, the lens unit 460 may maintain the first steering angle as 0 degrees.

The performance and structure of the lens unit 460 may vary according to the purpose of use and required performance of the optical device 400. As factors determining the performance of the lens unit 460, field of view (FOV), uniformity of angle, beam divergence angle, etc. can be exemplified. For example, the lens unit 460 may be designed to have FOV of 120 degrees. When the lens unit 460 is configured using multiple lenses, it is possible to easily satisfy requirements (i.e., FOV) of the optical device 400 as compared to a case in which the lens unit 460 is configured using a single lens.

For example, the lens unit 460 may further include an aperture (not shown) formed between the lenses 462 and 464. In this case, the lenses 462 and 464 may have a size more than twice the beam spot of the fourth beams L4_a, L4_b and L4_c and the aperture may have a size more than 0.5 times the beam spot. The sizes of the lenses 462 and 464 and the aperture may affect the sizes of the lens unit 460 and the optical device 400.

In the lens unit 460 including at least one lens, the value obtained by dividing the incidence angle (i.e., a steering angle of the fourth beams L4_a, L4_b and L4_c) of the lens unit 460 by the refraction angle (i.e., a steering angle of the fifth beams L5_a, L5_b and L5_c) of the lens unit 460 on the basis of the optical axes of the third beams L3_1 to L3_k may be in the range of 0.1 to 100.

FIG. 6 illustrates a first optical phase array 32 applicable to the first to fourth optical devices 100, 200, 300 and 400 (refer to FIGS. 2 to 5).

As shown, the first optical phase array 32 may include a plurality of elements arranged in an m×n matrix form.

Each element included in the first optical phase array 32 may have a spherical surface and the absolute value of the curvature of the spherical surface may be greater than 10 mm. In addition, each element may have a size more than 1.5 times the wave surface of the first beam L1. Further, each element may have a refractive index in the range of 1 to 2.7. The value obtained by dividing the size of the beam spot of beams output from the elements included in the first optical phase array 32 by a beam spot spacing may be less than 0.5.

The first optical phase array 32 may be a transmissive or reflective element physically separated from the light source devices 120, 220, 320 and 420 (refer to FIGS. 2 to 5) emitting the first beam L1. In addition, the first optical phase array 32 may be a coating film attached to the light source devices 120, 220, 320 and 420 (refer to FIGS. 2 to 4).

For example, when the first optical phase array 32 is a transmissive element, the first optical phase array 32 may contain at least one of glass, silicon, PMMA and polycarbonate.

When the first optical phase array 32 is a reflective element, the first optical phase array 32 may include a single layer or a plurality of layers containing at least one of aluminum (Al), gold (Au), platinum (Pt) and silver (Ag).

FIG. 7 illustrates the surface of the first optical phase array 32 shown in FIG. 6.

Referring to FIGS. 7(a) and 7(b), the first optical phase array 32 may have a characteristic shape in which elements having different curvatures are arranged. In the first optical phase array 32, the curvatures of the elements may be determined according to optical characteristics required for the optical devices 100, 200, 300 and 400 (refer to FIGS. 2 to 5) and thus the overall pattern of the first optical phase array may be changed.

FIG. 8 illustrates a second optical phase array 33 applicable to the first to fourth optical devices 100, 200, 300 and 400 (refer to FIGS. 2 to 5).

As shown, the second optical phase array 33 may include a plurality of elements arranged in an m×n matrix form.

Each element included in the second optical phase array 33 may have an uneven surface. Here, the height of unevenness may be greater than 1 mm. In addition, each element may have a size more than 1.5 times the wave surface of the first beam L1. Further, each element may have a refractive index in the range of 1 to 2.7. The value obtained by dividing the size of the beam spot of beams output from the elements included in the second optical phase array 33 by a beam spot spacing may be less than 0.5.

The optical phase array 33 may be a transmissive or reflective element physically separated from the light source devices 120, 220, 320 and 420 (refer to FIGS. 2 to 5) emitting the first beam L1. In addition, the optical phase array 33 may be a coating film attached to the light source devices 120, 220, 320 and 420 (refer to FIGS. 2 to 4).

For example, when the first optical phase array 33 is a transmissive element, the optical phase array may contain at least one of glass, silicon, PMMA and polycarbonate.

When the optical phase array 33 is a reflective element, the optical phase array may include a single layer or a plurality of layers containing at least one of aluminum (Al), gold (Au), platinum (Pt) and silver (Ag).

FIG. 9 illustrates the surface of the second optical phase array 33 shown in FIG. 8.

Referring to FIGS. 9(a) and 9(b), the second optical phase array 33 may have a characteristic shape in which elements having different uneven patterns are arranged. In the second optical phase array 33, the uneven patterns of the elements may be determined according to optical characteristics required for the optical devices 100, 200, 300 and 400 (refer to FIGS. 2 to 5) and thus the overall pattern of the first optical phase array may be changed. When the elements in the second optical phase array 33 have uneven patterns, uneven patterns may be determined according to positions of the elements in the second optical phase array 33.

FIG. 10 illustrates a beam steering unit 50 applicable to the first to fourth optical devices 100, 200, 300 and 400 (refer to FIGS. 2 to 5).

As shown, the beam steering unit 50 may include a spot formation array 52, a diffusion array 544 and a steering array 56. All of the spot formation array 52, the diffusion array 544 and the steering array 56 may have an m×n matrix form.

For example, the spot formation array 52 may include first elements 52_1 and 52_2 in the form of a convex lens, the diffusion array 54 may include second elements 54_1 and 54_2 in the form of a concave lens, and the steering array 56 may include third elements 56_1 and 56_2 in the form of a convex lens. In this case, the first elements, 52_1 and 52_2, the second elements 54_1 and 54_2, and the third elements 56_1 and 56_2 may have curvatures of more than 25 mm.

In addition, the distance between the center of each element included in the spot formation array 52, the diffusion array 54 and the steering array 56 and the center of a neighboring element may be 0.5 times to twice a beam spot spacing. For example, the distance between the centers of two first elements 52_1 and 52_2 in the spot formation array 52 may correspond to the beam spot spacing. The distance between the centers of two elements 54_1 and 54_2 in the diffusion array 54 may be 0.5 times the beam spot spacing. The distance between the centers of two elements 56_1 and 56_2 in the steering array 56 may be twice the beam spot spacing. The distance between neighboring elements can determine the size of the beam steering unit 50 and can be designed depending on the purpose of use of the optical devices 100, 200, 300 and 400 (refer to FIGS. 2 to 5). In addition, the distance between neighboring elements with respect to the beam spot spacing may be varied according to the range of the first steering angle of the beam steering unit 50.

Some of the spot formation array 52, the diffusion array 54 and the steering array 56 may not include elements in the form of a lens. For example, the diffusion array 54 may include apertures having sizes more than 0.5 times the size of a beam spot. In addition, the diffusion array 154 may be configured as a combination of lenses and apertures in which the lenses are provided at the center and the apertures are provided at the edge. When the diffusion array 154 includes the apertures, the apertures may have different diameters according to positions in the array.

FIG. 11 illustrates the operation of the beam steering unit 50 shown in FIG. 10.

As shown, the spot formation array 52, the diffusion array 54 and the steering array 565 in the beam steering unit 50 may be controlled by the steering controller 114, 124, 134 and 144 (refer to FIGS. 2 to 5) in the driving unit 110, 210, 310 and 410 (refer to FIGS. 2 to 5). The spot formation array 52 and the steering array 56 perform translational motion.

The range of the translational motion of the spot formation array 52 and the steering array 56 may be less than 2 mm, and the spot formation array 52 and the steering array 56 may perform translational motion in different directions. For example, the spot formation array 52 can be moved in the y-axis direction and the steering array 56 can be moved in the z-axis direction.

The fourth beam L4_a output from the beam steering unit 50 has deviated from the optical axis of the third beams L3_1 to L3_k by the first steering angle. For example, if the third beams L3_1 to L3_k travel in the horizontal direction, an angle at which the fourth beam L4_a deviates from the horizontal direction can be regarded as the first steering angle. If the first steering angle is +20 degrees, the fourth beam L4_a output from the beam steering unit 50 deviates from the optical axis of the third beams L3_1 to L3_k by 20 degrees in a specific direction (e.g., z-axis direction).

FIG. 12 illustrates a first lens structure 60A applicable to the first to fourth optical devices 100, 200, 300 and 400 (refer to FIGS. 2 to 5).

As shown, the first lens structure 60A may include a single lens having a width W1 of 20 mm and a height H1 of 5 mm. The width IW1 of an incident part to which beams are input is 5 mm and the width OW1 of an emission part through which beams are output is 14 mm. The distance D1 between the first lens structure 60A and a beam steering unit (not shown) (the distance between a beam emission point and the incident part of the lens) is 2 mm. The first lens structure 60A is characterized by uniformity of angle of 60%, FOV of 120 degrees and a beam divergence angle of 4 to 7 degrees. Application of the first lens structure 60A having a single lens may be limited according to the purpose of use the optical devices 100, 200, 300 and 400 (refer to FIGS. 2 to 5) because the beam divergence angle thereof is relatively wide.

Although the first lens structure 60A is configured using a single lens, the first lens structure 60A can readjust the first steering angle of the beam steering unit in the range of 0 to ±100 degrees. The value obtained by dividing the incidence angle of the first lens structure 60A by the refraction angle thereof on the basis of the optical axis of a third beam input to the beam steering unit may be in the range of 0.1 to 100.

FIG. 13 illustrates a second lens structure 60B applicable to the first to fourth optical devices 100, 200, 300 and 400 (refer to FIGS. 2 to 5).

As shown, the second lens structure 60B may include a combination of a plurality of lenses, which has a width W2 of 32 mm and a height H2 of 15 mm. The width IW2 of an incident part to which beams are input is 8 mm and the width OW2 of an emission part through which beams are output is 23 mm. The distance D2 between the second lens structure 60B and a beam steering unit (not shown) (the distance between a beam emission point and the incident part of the lens combination) is 5 mm. The second lens structure 60B is characterized by uniformity of angle of 90%, FOV of 120 degrees and a beam divergence angle of 3.4 to 4.7 degrees.

Although the second lens structure 60B is configured using two lenses, the second lens structure 60B can readjust the first steering angle of the beam steering unit in the range of 0 to ±100 degrees. The value obtained by dividing the incidence angle of the second lens structure 60B by the refraction angle thereof on the basis of the optical axis of a third beam input to the beam steering unit may be in the range of 0.1 to 100.

FIG. 14 illustrates a third lens structure 60C applicable to the first to fourth optical devices 100, 200, 300 and 400 (refer to FIGS. 2 to 5).

As shown, the third lens structure 60C may include a combination of a plurality of lenses, which has a width W3 of 45 mm and a height H3 of 25 mm. The width IW3 of an incident part to which beams are input is 14 mm and the width OW3 of an emission part through which beams are output is 32 mm. The distance D3 between the third lens structure 60C and a beam steering unit (not shown) (the distance between a beam emission point and the incident part of the lens combination) is 8 mm. The third lens structure 60C is characterized by uniformity of angle of 90%, FOV of 120 degrees and a beam divergence angle of 0.4 to 3.4 degrees.

Although the third lens structure 60C is configured using three lenses, the third lens structure 60C can readjust the first steering angle of the beam steering unit in the range of 0 to ±100 degrees. The value obtained by dividing the incidence angle of the third lens structure 60C by the refraction angle thereof on the basis of the optical axis of a third beam input to the beam steering unit may be in the range of 0.1 to 100.

A single lens, a combination of multiple lenses and a combination of multiple lenses and an aperture included in the lens units 160, 260, 360 and 460 (refer to FIGS. 2 to 5) may be changed according to the purpose of use, requirements and degree of integration of the optical devices 100, 200, 300 and 400 (refer to FIGS. 2 to 5). For example, when the lens unit is configured using a combination of multiple lenses, the beam input region and the beam output region of the lens unit can be widened compared to a case in which a single lens is used. Accordingly, the lens units can increase the range within which the steering angle of the fourth beams L4_*a*, L4_*b* and L4_*c* output from the beam steering unit 150, 250, 350 and 450 (refer to FIGS. 2 to 5) can be increased.

The above-described optical device employs LiDAR (Light Detection And Ranging) and can radiate a laser pulse and measure an arrival time of a reflected laser pulse to calculate spatial coordinates of the reflection point and extract 3-dimensional information. Accordingly, when the optical device is used, a correct digital elevation model (DEM) of a building or a geographic feature can be generated because reflection time differs according to characteristics of objects. In addition, it is possible to rapidly and efficiently generate a 3-dimensional model by automatically constructing a building layer combined with high-definition images, acquiring information that is difficult to obtain from an optical image, separately generating DEMs of geographical features and DEMs of buildings and structures using acquired high-accuracy DEMs and combining the DEMs using the optical device. Furthermore, the optical device can be set in a vehicle and applied to a system for extracting 3-dimensional spatial information such as DEMs of roads, lanes, street furniture and the like and thus can be efficiently used for automatic operation systems for vehicles and acquisition of accurate DEMs of a downtown area and roads.

Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Thus, the above embodiments are to be considered in all respects as illustrative and not restrictive. The scope of the invention should be determined by reasonable interpretation of the appended claims and all change coming within the equivalent scope of the invention are included in the scope of the invention.

MODE FOR INVENTION

A mode for the invention has been sufficiently described in the above-described "Best Mode".

INDUSTRIAL APPLICABILITY

The light detection and ranging devices according to embodiments can rapidly and efficiently generate a 3-dimensional model by automatically constructing a building layer combined with high-definition images, acquiring information that is difficult to obtain from an optical image, separately generating DEMs of geographical features and DEMs of buildings and structures using acquired high-accuracy DEMs and combining the DEMs using the optical device according to embodiments. Furthermore, the optical device can be set in a vehicle and applied to a system for extracting 3-dimensional spatial information such as DEMs of roads, lanes, street facility and the like and thus can be efficiently used for automatic operation systems for vehicles and acquisition of accurate DEMs of a downtown area and roads.

The invention claimed is:

1. An optical device comprising:
a beam splitting unit for receiving one first beam and outputting k (k being a natural number) second beams;
a beam steering unit for changing the direction of the k second beams by a first steering angle to output third beams;
a lens unit for receiving the third beams, adjusting the first steering angle and outputting fourth beams; and
a driving unit for controlling a first beam emission angle,
wherein the beam splitting unit comprises:
an optical phase array for receiving the first bean and generating the k second beams having different directivities; and
a direction adjuster for individually converging the k second beams to adjust the directions of the second beams to a first direction, and
wherein a wave front of the second beams is wider than that produced by dividing a wave front of the first beam by k.

2. The optical device according to claim 1, wherein the wave front of the second beams are lower than 50% of the wave front of the first beam.

3. The optical device according to claim 1, wherein the optical phase array is composed of elements in an m×n matrix (m and n being natural numbers equal to or greater than 3, (m×n)≥k), and the elements are distributed in a discrete space form with respect to a plurality of direction vectors.

4. The optical device according to claim 3, wherein the elements include a spherical surface, and the absolute value of the curvature of the spherical surface is greater than 10 mm.

5. The optical device according to claim 3, wherein the elements include uneven patterns having heights less than 1 mm.

6. The optical device according to claim 3, wherein the elements have sizes more than 1.5 times the wave front of the first beam and refractive indexes in the range of 1 to 2.7.

7. The optical device according to claim 3, wherein the value obtained by dividing the size of a beam spot of beams output from the elements by a beam spot spacing is equal to or less than 0.5.

8. The optical device according to claim 1, wherein the optical phase array is a reflective element physically separated from a light source device emitting the first beam or a coating film attached to the light source device.

9. The optical device according to claim 8, wherein the reflective element is a single layer or multiple layers containing at least one of Al, Au, Pt and Ag.

10. The optical device according to claim 1, wherein the direction adjuster is composed of a plurality of elements corresponding to the plurality of second beams, and the elements have different curvatures according to position.

11. The optical device according to claim 10, wherein the elements are composed of lenses and contain at least one of glass, silicon, PMMA and polycarbonate.

12. The optical device according to claim 10, wherein the elements are composed of mirrors, and reflective surfaces of the mirrors include a single layer or multiple layers containing at least one of Al, Au, Pt and Ag.

13. An optical device comprising:
a beam splitting unit for receiving one first beam and outputting k (k being a natural number) second beams;
a beam steering unit for changing the direction of the k second beams by a first steering angle to output third beams;
a lens unit for receiving the third beams, adjusting the first steering angle and outputting fourth beams; and
a driving unit for controlling a first beam emission angle,
wherein the beam splitting unit comprises:
an optical phase array for receiving the first beam and generating the k second beams having different directivities; and
a direction adjuster for individually converging the k second beams to adjust the directions of the second beams to a first direction, and
wherein the beam steering unit comprises:
a spot formation array for focusing the second beams to form a plurality of beam spots;
a diffusion array for diffusing all or some of the plurality of beam spots and outputting the beam spots; and
a steering array for changing the output of the diffusion array by the first steering angle to output the third beams.

14. The optical device according to claim 13, wherein the first steering angle is determined in the range of 0 to ±25 degrees.

15. The optical device according to claim 13, wherein the range of translational motion of the spot formation array and the steering array is equal to or less than 2 mm, and the spot formation array and the steering array perform translational motion in different directions.

16. The optical device according to claim 13, wherein the spot formation array includes first elements in the form of a convex lens, the diffusion array includes second elements in the form of a concave lens and the steering array includes third elements in the form of a convex lens.

17. The optical device according to claim 1, wherein the diameter or major axis length of the wave front of the first beam is in the range of 100 nm to 2 mm.

18. An optical device comprising:
a beam splitting unit for receiving one first beam and outputting k (k being a natural number) second beams;
a beam steering unit for changing the direction of the k second beams by a first steering angle to output third beams;
a lens unit for receiving the third beams, adjusting the first steering angle and outputting fourth beams; and
a driving unit for controlling a first beam emission angle,
wherein the beam splitting unit comprises:
an optical phase array for receiving the first beam and generating the k second beams having different directivities; and
a direction adjuster for individually converging the k second beams to adjust the directions of the second beams to a first direction, and
wherein the lens unit includes one or more lenses or a combination of one or more lenses and a mirror and readjusts the first steering angle in the range of 0 to ±100 degrees.

19. The optical device according to claim 18, further comprising an aperture between the lenses,
wherein the lenses have a size more than twice the beam spot size of the third beam, and the aperture has a size more than 0.5 times the beam spot size.

20. The optical device according to claim 18, wherein the value obtained by dividing an incidence angle of the lens unit by a refraction angle of the lens unit on the basis of the optical axis of the third beams is in the range of 0.1 to 100.

* * * * *